(12) United States Patent
Bender et al.

(10) Patent No.: US 10,296,448 B2
(45) Date of Patent: May 21, 2019

(54) CORRELATING TEST RESULTS VARIATIONS WITH BUSINESS REQUIREMENTS

(71) Applicant: International Business Machines Corporation, Armonk, NY (US)

(72) Inventors: Michael Bender, Rye Brook, NY (US); Wayne M. Delia, Poughkeepsie, NY (US); Gautam Majumdar, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/547,451

(22) Filed: Nov. 19, 2014

(65) Prior Publication Data

US 2016/0140032 A1 May 19, 2016

(51) Int. Cl.
*G06F 9/44* (2018.01)
*G06F 11/36* (2006.01)

(52) U.S. Cl.
CPC .................. *G06F 11/3692* (2013.01)

(58) Field of Classification Search
CPC ............. G06F 11/3684; G06F 11/3688; G06F 11/3692
See application file for complete search history.

(56) References Cited

U.S. PATENT DOCUMENTS

| | | | | |
|---|---|---|---|---|
| 7,822,630 B1* | 10/2010 | Smyth | ............... | G06Q 30/0202 702/19 |
| 8,185,877 B1* | 5/2012 | Colcord | ................... | G06F 9/44 717/124 |

(Continued)

FOREIGN PATENT DOCUMENTS

| CN | 102915303 A | 2/2013 |
|---|---|---|
| CN | 103309904 A | 9/2013 |

OTHER PUBLICATIONS

Gorawski et al; High Efficiency of Hybrid Resumption in Distributed Data Warehouses, Proceedings of the 16th International Workshop on Database and Expert Systems Applications (DEXA'05), AN-9034543/AN-8995553; 2005 & 2006.

(Continued)

*Primary Examiner* — Li B. Zhen
*Assistant Examiner* — Lenin Paulino
(74) *Attorney, Agent, or Firm* — Garg Law Firm, PLLC; Christopher K. McLane

(57) ABSTRACT

A method, system, and computer program product for relating test data to business requirements are provided in the illustrative embodiments. a test operation of a code is configured in a test data processing environment, a section in the code corresponding to a portion of a business requirements document. A set of baseline results is received. The test operation is executed, identifying the section of the code and associating the section of the code with a test result produced from the test operation. A determination is made whether the test result matches a first baseline result from the set of baseline results within a tolerance. When the test result does not match the first baseline result from the set of baseline results within the tolerance, the portion of the business requirements document is annotated.

17 Claims, 6 Drawing Sheets

(56) References Cited

U.S. PATENT DOCUMENTS

| | | | |
|---|---|---|---|
| 2008/0256393 A1* | 10/2008 | Ur | G06F 11/3616 |
| | | | 714/38.1 |
| 2010/0082378 A1* | 4/2010 | Isaacs | G06Q 10/063 |
| | | | 705/7.11 |
| 2012/0265726 A1 | 10/2012 | Padmanabhan et al. | |
| 2013/0185697 A1* | 7/2013 | Farchi | G06F 8/71 |
| | | | 717/113 |
| 2014/0244241 A1* | 8/2014 | Ghaisas | G06F 17/27 |
| | | | 704/9 |

OTHER PUBLICATIONS

Anonumus, Method and Apparatus for generating test data using ETL tool, Jun. 19, 2012.
Anonumus, System and Methods to Dynamically create ETL processes, execute them remotely and consume its report in alternate process(es), Oct. 29, 2012.
Coyle et al; Method to Resume Extraction, Transformation, and Load (ETL) Across Multiple Data Stores, May 6, 2013.
Gorawski et al; Resumption of Data Extraction Process in Parallel Data Warehouses, 2006.

* cited by examiner

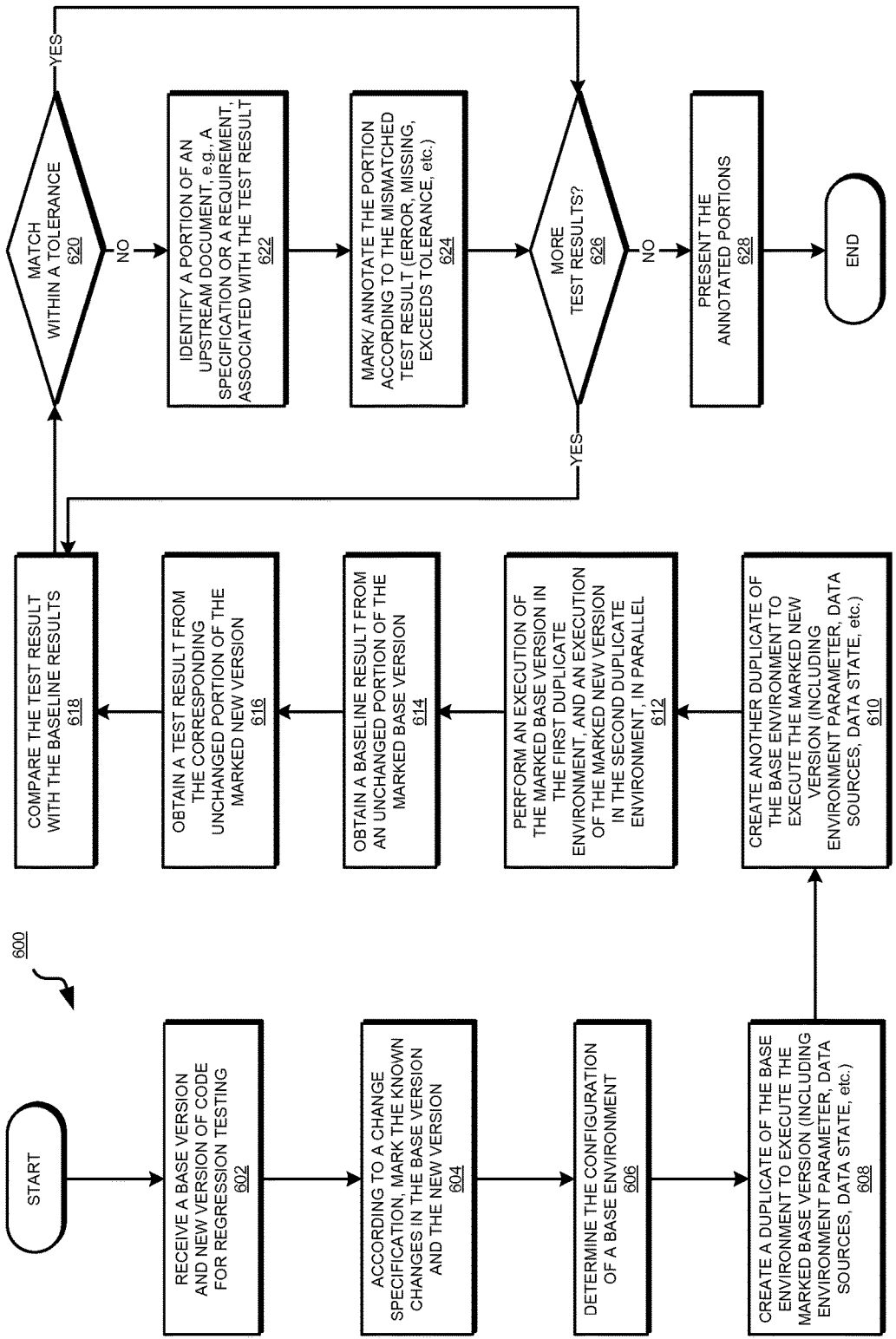

CORRELATING TEST RESULTS VARIATIONS WITH BUSINESS REQUIREMENTS

TECHNICAL FIELD

The present invention relates generally to a method, system, and computer program product for testing code. More particularly, the present invention relates to a method, system, and computer program product for correlating test result variations with business requirements.

BACKGROUND

Data management operations often have to extract the data from one or more data sources. The extracted data is frequently not in a form that is suitable for consumption or usage in a given data processing system. Therefore, the data management operations also have to often transform that data into a consumable form, such as for loading into a repository or a database. The process of extraction, transformation, and loading (ETL) of data in a given data processing system is compactly referred to as ETL. Accordingly, a data processing environment where ETL is employed is referred to as an ETL environment.

ETL operations are used in a variety of forms, in a variety of data processing environments, and for a variety of purposes. Database management is an example of a common circumstance in which ETL operations are used for extracting data from one or more data sources, including other databases; transforming that data according to some business requirements; and loading that transformed data into one or more destinations, including reports, workflows, a database, or other systems.

Typically, a business unit specifies a business requirement for which data has to be manipulated in a given ETL environment. A business requirement specifies a need or use of certain information in the context of a business operation. For example, a business requirement can be a text document describing a need, a use, a goal, or an objective (collectively hereinafter, "objective") expected to be satisfied. The document may or may not specify any particular data for this purpose. Even when the data that is usable for this purpose is identified in the document, the identified data is insufficient to extract the data from a source, in a usable form, to satisfy the objective.

A team typically translates a business requirement into a technical specification. The technical specification describes one or more operations that have to be performed with some data, to achieve an objective of the business requirement. For example, the technical specification may specify a data source and a manner of extracting a particular data therefrom, a transformation that may have to be applied to the data, and a subsequent computation or storing operation with that data to produce a result that satisfies the objective of the business requirement.

Software developers implement the technical specification into code. The code, when executed on a data processing system, uses the data sources to obtain the data, performs the specified operations on the data, and produces the results.

The code is tested for satisfactory functioning. For example, a testing user creates one or more test cases for executing the code. The code, when executed according to a test case, produces test results. A user examines the test results to determine whether the code functioned as expected, and whether the results generated would satisfy the objective of the business requirement.

SUMMARY

The illustrative embodiments provide a method, system, and computer program product for correlating test result variations with business requirements. An embodiment includes a method for relating test data to business requirements. The embodiment configures, in a test data processing environment, a test operation of a code, a section in the code corresponding to a portion of a business requirements document. The embodiment receives a set of baseline results. The embodiment executes the test operation, wherein the test operation identifies the section of the code, and wherein the test operation associates the section of the code with a test result produced from the test operation. The embodiment determines whether the test result matches a first baseline result from the set of baseline results within a tolerance. The embodiment annotates, responsive to the test result not matching a first baseline result from the set of baseline results within the tolerance, the portion of the business requirements document.

Another embodiment further receives a configuration information, wherein the configuration information relates to a base data processing environment where a base version of the code has been executed, wherein the base version of the code is modified according to a change requirement to result in the code. The embodiment configures the test data processing environment according to the configuration information such that the test data processing environment is a duplicate of the base data processing environment.

Another embodiment further configures a duplicate base data processing environment according to the configuration information such that the duplicate base data processing environment is another duplicate of the base data processing environment. The embodiment executes in parallel, the base version of the code in the duplicate base data processing environment and the code in the test data processing environment. The embodiment obtains the set of baseline results from parallel execution of the base version of the code in the duplicate base data processing environment.

Another embodiment further identifies an section of the base version of the code wherein the section of the base version of the code is not responsive to the change requirement, and wherein the section of the code corresponds to the section of the base version of the code. The embodiment executes in parallel, the section of the base version of the code and the section of the code.

Another embodiment further annotates, responsive to the test result not matching the first baseline result from the set of baseline results within the tolerance, a portion of a technical specification document, wherein the section of the code further corresponds to a portion of the technical specification document, the code being generated according to the technical specification document, and the technical specification document being generated according to the business requirements document.

Another embodiment further presents the annotated portion of the technical specification document. The embodiment accepts a user input at the presented annotated portion of the technical specification document, the user input causing a selection of the section of the code. The embodiment changes the section of the code such that a second test result from a second test operation on the changed section of the code matches the first baseline result from the set of baseline results within the tolerance.

Another embodiment further presents the annotated portion of the business requirements document. The embodiment accepts a user input at the presented annotated portion of the business requirements document, the user input causing a selection of the section of the code. The embodiment changes the section of the code such that a second test result from a second test operation on the changed section of the code matches the first baseline result from the set of baseline results within the tolerance.

In another embodiment, the first baseline result comprises an expected result from the test operation, the expected result being sufficient to satisfy an objective in the portion of the business requirements document.

Another embodiment includes a computer program product for relating test data to business requirements. The embodiment further includes one or more computer-readable tangible storage devices. The embodiment further includes program instructions, stored on at least one of the one or more storage devices, to configure, in a test data processing environment, a test operation of a code, a section in the code corresponding to a portion of a business requirements document. The embodiment further includes program instructions, stored on at least one of the one or more storage devices, to receive a set of baseline results. The embodiment further includes program instructions, stored on at least one of the one or more storage devices, to execute the test operation, wherein the test operation identifies the section of the code, and wherein the test operation associates the section of the code with a test result produced from the test operation. The embodiment further includes program instructions, stored on at least one of the one or more storage devices, to determine whether the test result matches a first baseline result from the set of baseline results within a tolerance. The embodiment further includes program instructions, stored on at least one of the one or more storage devices, to annotate, responsive to the test result not matching a first baseline result from the set of baseline results within the tolerance, the portion of the business requirements document.

Another embodiment includes a computer system for relating test data to business requirements. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to configure, in a test data processing environment, a test operation of a code, a section in the code corresponding to a portion of a business requirements document. The embodiment further includes program instructions, stored on at least one of the one or more storage devices for execution by at least one of the one or more processors via at least one of the one or more memories, to receive a set of baseline results. The embodiment further includes program instructions, stored on at least one of the one or more storage devices for execution by at least one of the one or more processors via at least one of the one or more memories, to execute the test operation, wherein the test operation identifies the section of the code, and wherein the test operation associates the section of the code with a test result produced from the test operation. The embodiment further includes program instructions, stored on at least one of the one or more storage devices for execution by at least one of the one or more processors via at least one of the one or more memories, to determine whether the test result matches a first baseline result from the set of baseline results within a tolerance. The embodiment further includes program instructions, stored on at least one of the one or more storage devices for execution by at least one of the one or more processors via at least one of the one or more memories, to annotate, responsive to the test result not matching a first baseline result from the set of baseline results within the tolerance, the portion of the business requirements document.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of another example process for correlating test result variations with business requirements in accordance with an illustrative embodiment.

DETAILED DESCRIPTION

Figure 1:
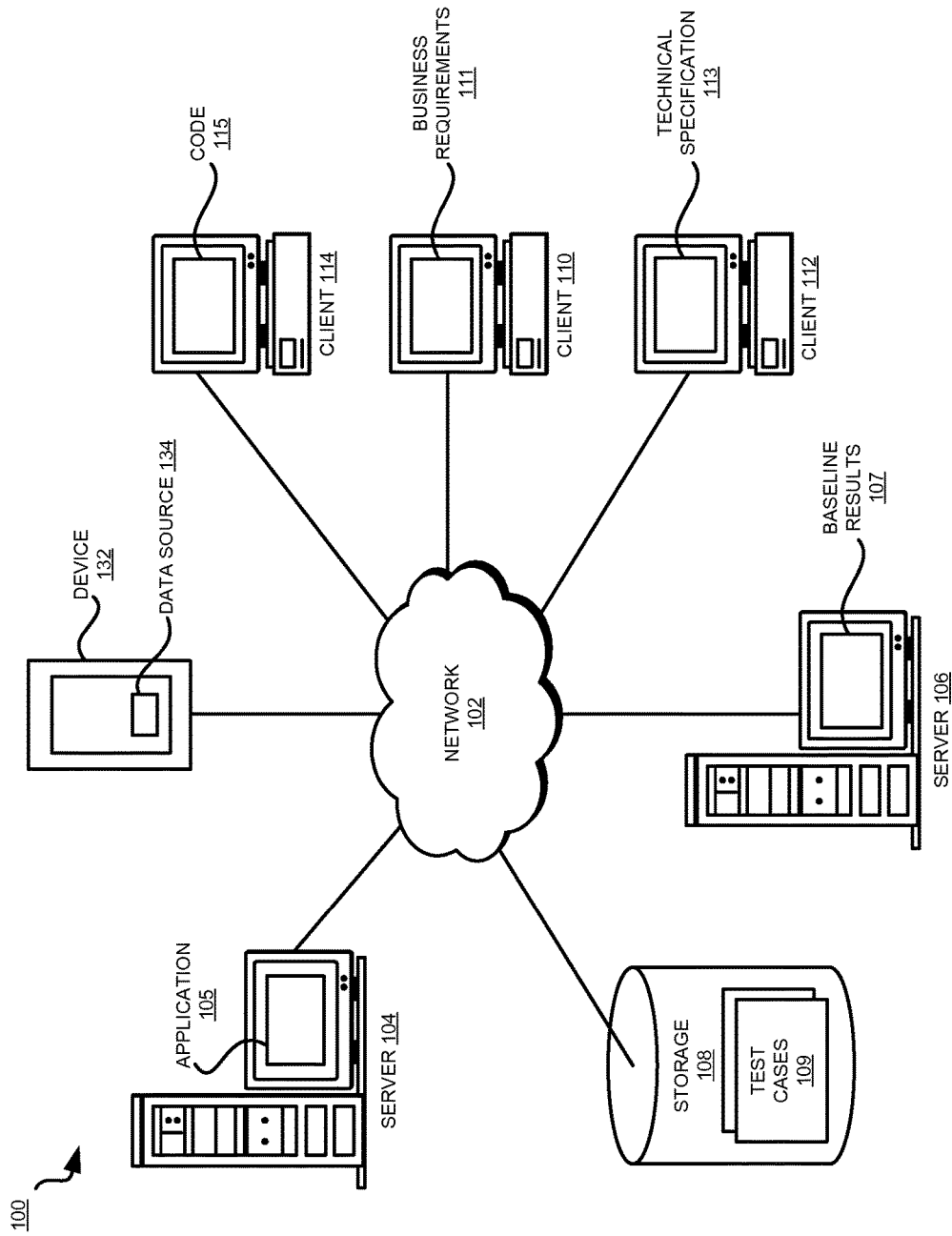
FIG. 1 depicts a block diagram of a network of data processing systems in which illustrative embodiments may be implemented.

The illustrative embodiments recognize that in a given business requirement document, different portions may have different objectives. Accordingly, different code or code-sections implement the technical specifications describing the different portions of the business requirements.

A typical workflow using the presently available ETL solutions converts the business requirements to a technical specification, converts the technical specification to code, generates test cases for the code, and executes or tests the code according to the test cases to produce test results.

The illustrative embodiments recognize that in ETL environments, a need exists to not only test every ETL operation, but to also prove that the operation has been tested. Furthermore, a need exists for relating the test results with one or more business requirement.

The illustrative embodiments recognize that presently, the only way to prove that the full ETL functionality has been tested is by manually reviewing the code corresponding to the business requirement, validating that all code is executed during a test, that no errors have been introduced in the test result, and that the test results do not deviate from the business requirement.

Accordingly, presently, the test results are frequently downloaded into desktop tools where a user compares the test results with expected results. The illustrative embodiments recognize that such a manner of relating the results of a test with a corresponding business requirement is error-prone, time consuming, and prohibitive for large volumes of data.

The illustrative embodiments recognize that automatically relating the test results with corresponding business requirement portions is desirable to reduce the cost, chances of error, and misdiagnosis, especially in ETL environments used in commercial business settings today. The illustrative embodiments further recognize that annotating the business requirement portions to indicate whether a test result satisfied the objective of the business requirement portion within a specified tolerance, exceeded the tolerance, was absent in the testing, or was otherwise unsuitable for the business requirement portion would be helpful in any remediation workflow.

The illustrative embodiments used to describe the invention generally address and solve the above-described problems and other problems related to automatically relating test results with business requirements. The illustrative embodiments provide a method, system, and computer program product for correlating test result variations with business requirements.

Within the scope of the illustrative embodiments, relating a result of a test execution of code with a business requirement that corresponds to the code includes associating the test result with the business requirement of a portion thereof. Relating the test with the business requirement according to the illustrative embodiments further includes establishing whether the test result satisfies an objective of the business requirement within a tolerance. Relating the test with the business requirement according to the illustrative embodiments further includes marking or annotating the business requirement or the portion based on whether the test result satisfies the objective of the business requirement within the tolerance.

The annotated business requirements document according to an embodiment would allow a user to more expeditiously and accurately focus any change efforts on the portion that has an undesirable annotation, to correct a test result using an existing workflow. For example, suppose that an embodiment highlights or otherwise annotates a portion of the business requirements to show that a test result corresponding to that portion was missing in a test. By having such annotation available, the user can save a significant amount of effort in trying to identify an area of the business requirements, the technical specification, the code, the test case, or a combination thereof. The annotation enables the user to interact with the annotated portion of the business requirement to directly reach and modify the appropriate business requirement portion, technical specification, the code, the test case so that the test result is produced in a later test.

Other types of annotations similarly assist the user in locating the business requirements, the technical specification, the code, the test case, or some combination thereof, in reference to other types of test result anomalies. For example, a different annotation indicates that a test result corresponding to the annotated portion of the business requirements document exceeds a tolerance from the expected value. The user can similarly use the annotation to quickly make modifications to the business requirements, the technical specification, the code, the test case, or some combination thereof.

An existing integration tool generates the correspondence between a business requirements document, the technical specification, and the code that is generated by the tool. During a test execution of the code, an embodiment marks the beginning and end of a test operation. A test operation tests a section of the code. The embodiment marks the section of the code that was tested between the beginning and the end of the test operation. Accordingly, the embodiment identifies the portion of the business requirement that corresponds to the tested code section and was therefore subjected to test operation.

An embodiment identifies a test result produced from that test operation. The embodiment compares the test result with a baseline result to determine whether the test result matches the baseline result within a tolerance. The tolerance can be defined in any suitable manner depending upon the type of the result, the desired accuracy of the test result, and other considerations.

Depending upon how the test result compares with the baseline result, an embodiment annotates the identified portion of the business requirement. For example, one embodiment color-codes the portion as a part of annotating the portions. For example, when the test result and the baseline result match within the tolerance, the corresponding portion of the business requirement is color-coded in green. When the test result exists but does not match the baseline result match within the tolerance, the corresponding portion of the business requirement is color-coded in red. When the test result is absent, the corresponding portion of the business requirement is color-coded in gray.

The baseline results can be obtained in a variety of ways depending upon the testing being performed. In one example embodiment, the test operation exercises code that has not been previously used—in other words, new code. As one example, a business analyst may provide a set of expected results as baseline results. As another example, a component of the integration tool used for code generation may provide a set of expected results as baseline results.

In another example embodiment, the test operation exercises code that has been modified since a previous use—in other words, a different version of existing code. The existing code is regarded as a base version and the modified code is regarded as a new version.

An embodiment performs regression testing using the base version and the new version. Specifically, the embodiment performs regression testing on those sections of the base version and the new version that have not changed.

For example, using a change requirement, an embodiment identifies those sections of the base version that have changed in the new version. Therefore, the embodiment also identifies those sections of the base version that have not changed in the new version. The embodiment performs testing of the unchanged sections of the base version and the new version to determine whether the test of an unchanged section of the new version produces a test result that should not vary by more than a tolerance value, but does vary, from the result of executing the corresponding section of the base version under similar circumstances.

To create similar circumstances under which to test the unchanged sections of the base and new versions, an embodiment identifies a configuration of a data processing environment where the base version is or was operating. This configuration is referred to as a base configuration. The base configuration includes but is not limited to values of environment variables, identity of data sources and manner of extracting data therefrom, a state of the extracted data and existing data at a given time in the base configuration, processes executing in a system, and so on.

An embodiment configures a first data processing environment according to the base configuration. The embodiment configures the base version to execute in the first data processing environment. The embodiment further configures a second data processing environment according to the base configuration. The embodiment configures the new version to execute in the second data processing environment. Configured in this manner, the base version and the new version are expected to experience similar circumstances, access similar data sources, extract similar data, find similar states of data, experience similar performances, and so on.

The embodiment executes an unchanged section of the base version in the first data processing system to produce a base result. The base result is treated as a baseline result. The embodiment executes an unchanged section of the new version in the second data processing system to produce a test result. The comparing of the results and the annotation thereafter follows in a manner described earlier.

A method of an embodiment described herein, when implemented to execute on a device or data processing system, comprises substantial advancement of the functionality of that device or data processing system in relating code execution results with business requirements. For example, where prior-art stops at generating a test result and fails to establish the relationship between the test result and the business requirement that is expected to be satisfied by the result, an embodiment annotates the business requirement related to the result. Furthermore, an embodiment annotates in a way that is indicative of a suitability, unsuitability, or absence of the test result. Operating in a manner described herein, an embodiment allows a user to make modification decisions relative to the test results more expeditiously and accurately than the prior-art. Such manner of automatically relating test results to business requirements is unavailable in presently available devices or data processing systems. Thus, a substantial advancement of such devices or data processing systems by executing a method of an embodiment allows a user or a decision making process to expeditiously and accurately act upon the business requirements or other artifacts in an ETL environment that relate to certain test results, where a manual task according to the prior-art would be prohibitive due to the complexity or size of the data processing environment or the artifacts therein.

The illustrative embodiments are described with respect to certain data or information, sources and repositories, databases, documents or portions thereof, code or sections thereof, result sets, operations, configurations, annotations, tolerances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
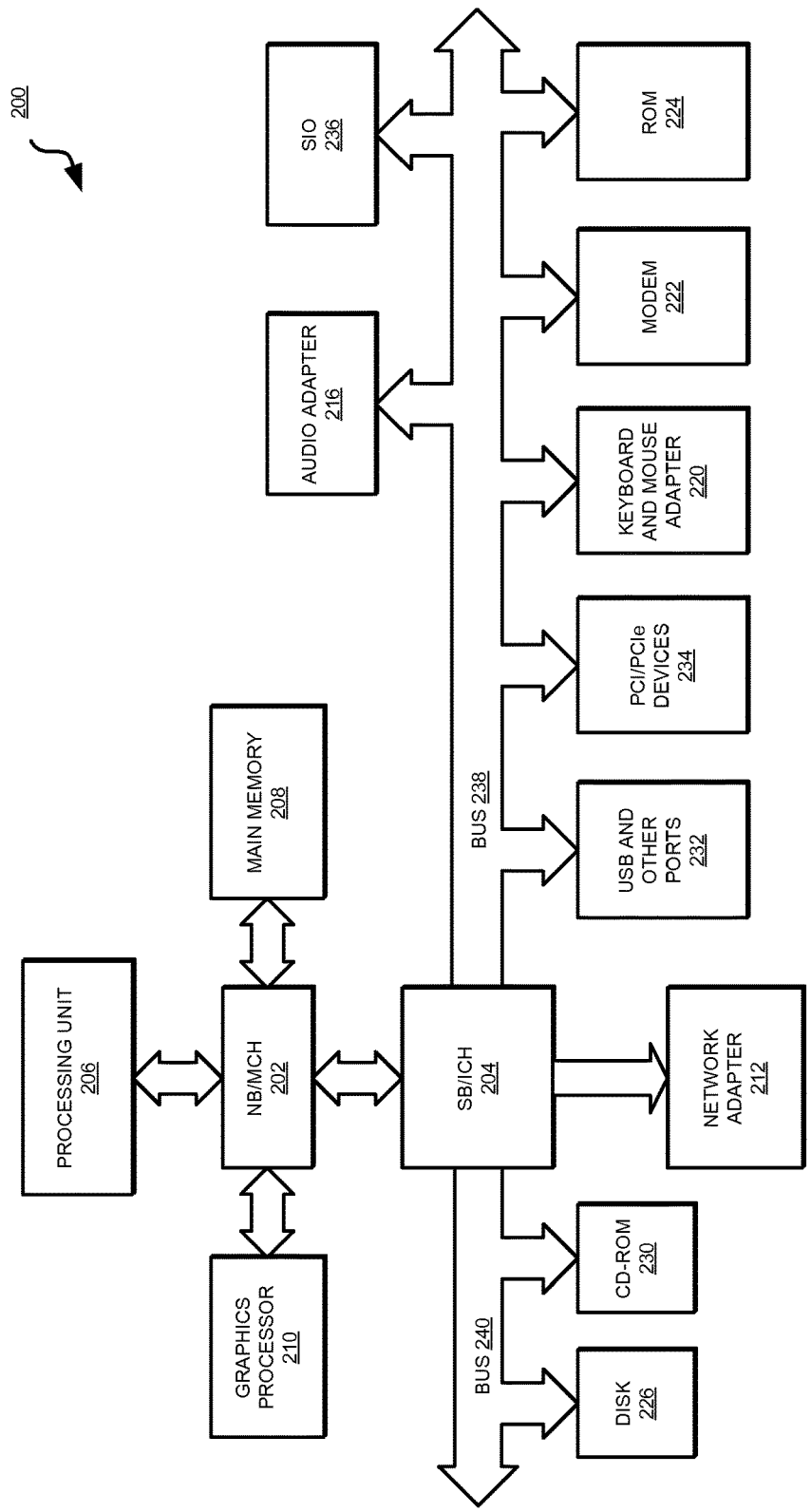
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a mobile device and is usable for executing an implementation of an embodiment, such as a version of application 105 that is configured in a manner suitable for execution on device 132. For example, device 132 can take the form of a smartphone, a tablet computer, a laptop computer, client 110 in a stationary or a portable form, a wearable computing device, or any other similarly purposed device. Device 132 is also usable as a data source, a data processing system or data processing environment for testing, a platform for presenting the annotated business requirements, and other purposes within the scope of the illustrative embodiments. Application 105 in server 104 implements an embodiment described herein. Business requirements 111 in client 110 are converted to technical specification 113 in client 112, from which code 114 in client 114 is generated. Using test cases 109 and baseline results 107, application 105 constructs one or more testing environments, and tests code 115. Application 105 relates a test result with a portion of business requirements 111 in the manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
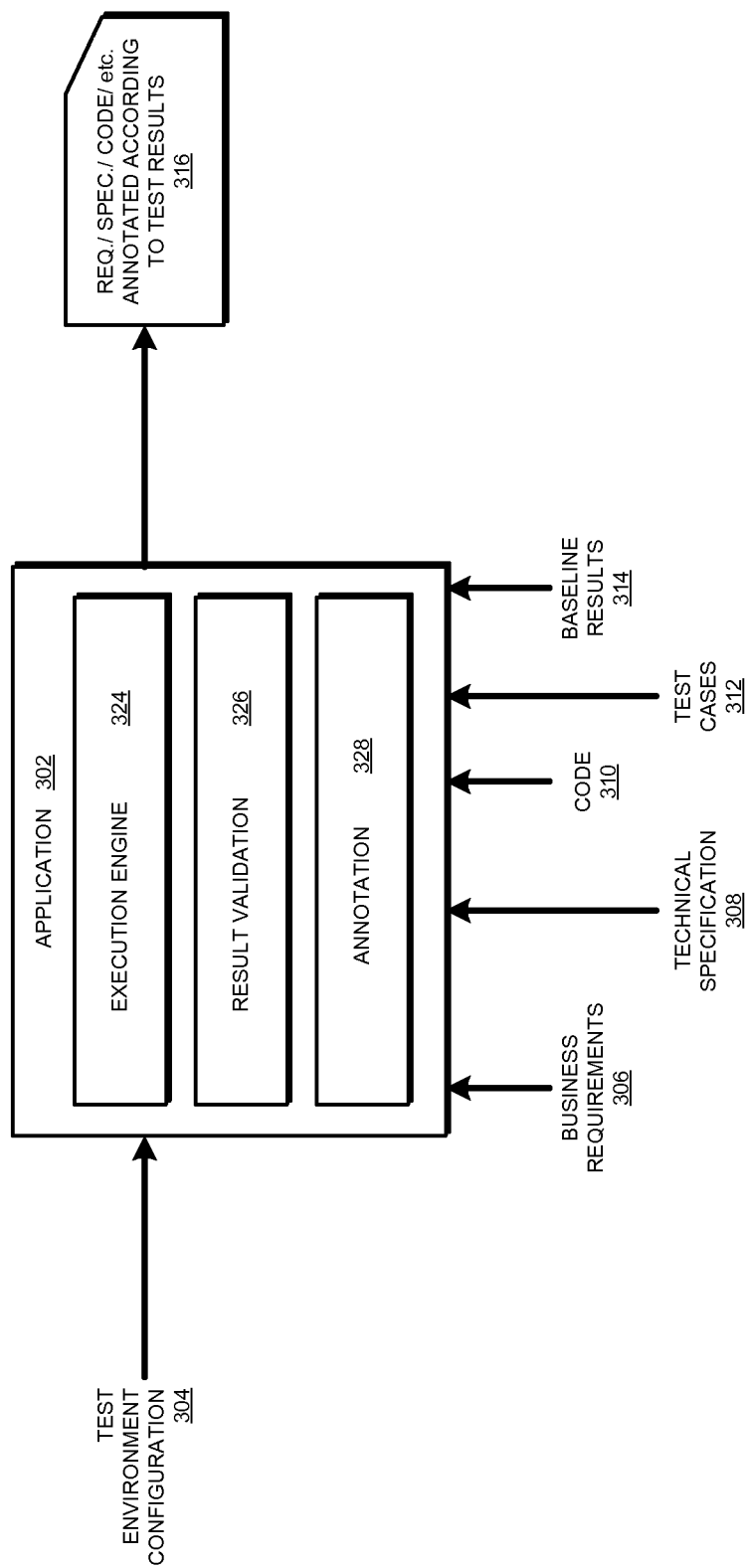
FIG. 3 depicts a block diagram of an example configuration for correlating test result variations with business requirements in accordance with an illustrative embodiment.

With reference to FIG. 3, this figure depicts a block diagram of an example configuration for correlating test result variations with business requirements in accordance with an illustrative embodiment. Application 302 is an example of application 105 in FIG. 1. Test environment configuration 304 is a configuration specified in any suitable manner, using which a test operation described earlier is to be performed by application 105.

Business requirements document 306 is an example of business requirements 111 in FIG. 1. Technical specification 308 is an example of technical specification 113 in FIG. 1. Code 310 is an example of code 115 in FIG. 1. Test cases 312 are one or more examples of test cases 109 in FIG. 1. Baseline results 314 are expected results from the test operation, as described elsewhere in this disclosure.

Not all inputs are necessary for the operation of application 302 described herein. For example, business requirements 306 may be supplied to application 302 when annotated business requirements are desired as output 316. An embodiment can annotate other artifacts in an ETL environment's workflow. For example, an embodiment can annotate a technical specification by relating a portion of the technical specification with a test result in a manner similar to annotating a business requirement portion. Accordingly, technical specification 308 may be supplied to application 302 when an annotated technical specification is desired as output 316.

An embodiment can annotate multiple artifacts in an ETL environment's workflow. For example, business requirements 306 and technical specification 308 may both be supplied to application 302 when an annotated business requirements and an annotated technical specification is desired as output 316.

In addition, application 302 can annotate code 310 in a similar manner. Although certain test tools are able to highlight a code section that produced a certain output, such highlighting does not relate the output back to the business requirements. Thus, when application 302 is used to annotate code 312 in conjunction with annotating business requirements 306 and/or technical specification 308, a user has significantly more information to modify one or more artifacts in the ETL workflow in a more efficient and automated manner.

Component 324 executes code 310 according to one or more test cases 314 in a test environment constructed according to configuration 304. Component 324 marks the beginning and ending of a test operation on code 310, and identified the code section that was subjected to the test operation to produce a test result.

Component 326 validates the test result using a result in baseline results 314. For example, component 326 determines whether the test result matches the corresponding baseline result 314 within a defined tolerance.

When a code section is not executed or the code section encounters an error, the code section may to produce any test result. Accordingly, component 326 determines that the test result is absent, or the test result does not match the corresponding baseline result 314 within a defined tolerance, depending upon the output of component 324 or how component 326 is configured to output a result of the matching.

Using the outcome of result validation in component 326, component 328 annotates one or more artifacts of the ETL workflow according to the code section identified by component 324. For example, if the artifact is business requirements 306, component 328 produces one or more annotated portions of business requirements 306 in output 316. Similarly, if the artifact is technical specification 308, component 328 produces one or more annotated portions of technical specification 308 in output 316. If the artifact is code 310, component 328 produces one or more annotated sections of code 310 in output 316. When more than one artifact is provided, component 328 can select one, some, or all such artifacts for annotation and presentation in output 316.

Figure 4:
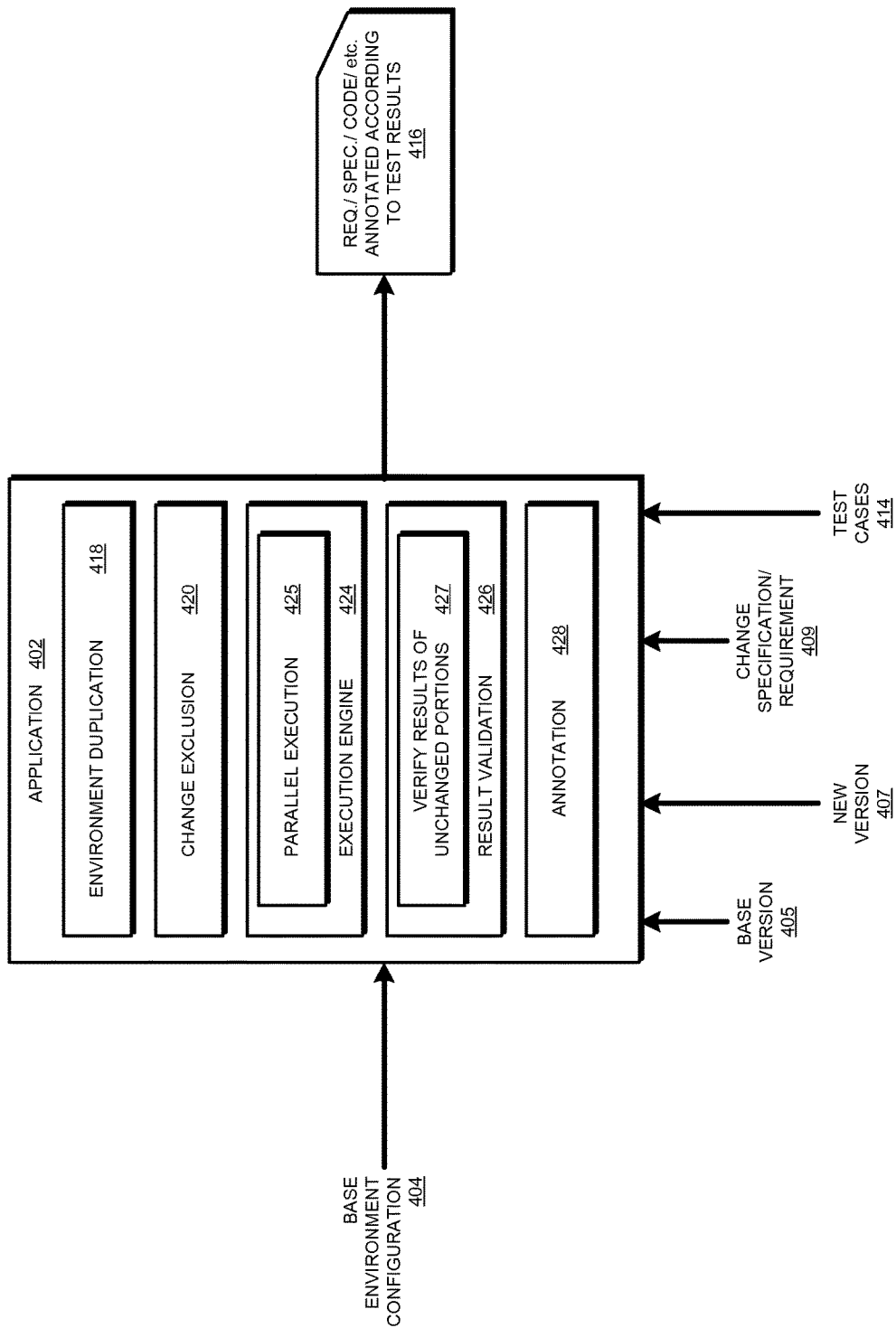
FIG. 4 depicts a block diagram of another example configuration for correlating test result variations with business requirements in accordance with an illustrative embodiment.

With reference to FIG. 4, this figure depicts a block diagram of another example configuration for correlating test result variations with business requirements in accordance with an illustrative embodiment. Application 402 is an example of application 302 in FIG. 3.

Application 402 is configured to perform regression testing on those code sections that have not been changed between two or more versions of code. As described elsewhere in this disclosure, base environment configuration 404 is a configuration of a data processing environment where the base version of a code is or was executing.

Base version 405 is the base version of code according to a version of a business requirement. Base version 405 is changed or modified into new version 407 according to change specification or change requirement 409. Test cases 412 are one or more examples of test cases 109 in FIG. 1.

Component 418 uses base environment configuration 404 to configure one or more data processing environments that duplicate or mirror the data processing environment where base version 405 is or was operating. For example, component 418 configures a first duplicate data processing environment according to base environment configuration 404 to execute base version 405 and configures a second duplicate data processing environment according to base environment configuration 404 to execute new version 407.

Component 420 identifies one or more sections of code that have changed in base version 405 and new version 407 according to change requirement 409. Application 402 does not regression test these sections.

The remaining sections in base version 405 and new version 407, by implication, are sections that should not have changed from base version 405 to new version 407. Component 425 in execution engine component 424 executes one or more of these unchanged sections of base version 405 and new version 407 in parallel according to one or more test cases 414. Parallel execution of sections of base version 405 and new version 407 causes both executions to proceed under similar circumstances in their respective duplicated data processing environments, using the same data sources, data states, processes, and other configurations according to base environment configuration 404.

Component 427 in result validation component 426 validates a test result produced from an unchanged section of new version 407 in a duplicated data processing environment. Specifically, component 427 compares the test result with a result produced from the parallel execution of a corresponding unchanged section of base version 405 in another duplicated data processing environment. Component 325 determines whether the test result matches within a defined tolerance the corresponding result from the parallel execution of the corresponding unchanged section of base version 405.

As in application 302 in FIG. 3, when a code section is not executed or the code section encounters an error, the code section may to produce any test result. Accordingly, component 427 determines that the test result is absent, or the test result does not match the corresponding base version result within a defined tolerance, depending upon the output of component 425 or how component 427 is configured to output a result of the matching.

Using the outcome of result validation in component 427, component 728 annotates one or more artifacts of the ETL workflow according to the code section identified by component 324. For example, in the depicted example, the artifact is a version of code that was expected to be unaffected by change requirement 409. Component 428 produces one or more annotated sections new version 407 in output 416. Because a section of base version 405 or new version 407 is relatable to a business requirement, component 428 can also annotate the business requirement, a technical specification corresponding to the business requirement, or a combination of these and other ETL environment artifacts in the manner described elsewhere in this disclosure.

Figure 5:
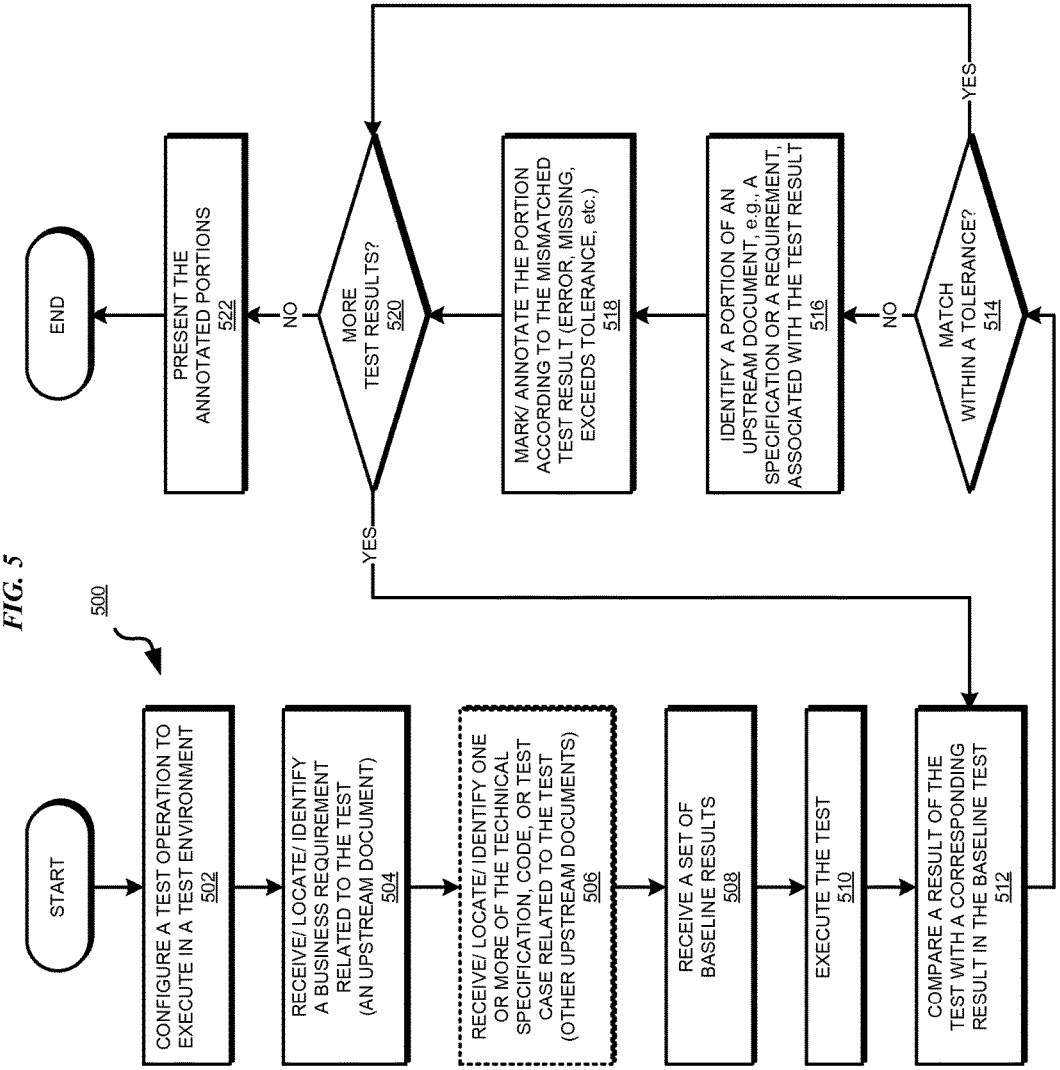
FIG. 5 depicts a flowchart of an example process for correlating test result variations with business requirements in accordance with an illustrative embodiment.

With reference to FIG. 5, this figure depicts a flowchart of an example process for correlating test result variations with business requirements in accordance with an illustrative embodiment. Process 500 can be implemented in application 302 in FIG. 3.

The application configures a test operation to execute on a given code, e.g., new code, in a data processing environment configured for testing (block 502). The application receives, locates, identifies, or otherwise accesses a business requirements document related to the code being tested (block 504). A business requirements document is an artifact that appears upstream from the testing operation of block 502 in an ETL workflow. Hence, a business requirements document is an upstream document for the purposes of block 504.

Similarly, a technical specification, the code, and a test case are also upstream from the testing operation of block 502. Therefore, a technical specification, the code, and a test case are also upstream documents for the purposes of block 504. Optionally, the application also receives, locates, identifies, or otherwise accesses one or more of these other upstream documents (block 506).

The application receives a set of baseline results (block 508). The application executes the test operation (block 510). The executing of the test operation in block 510 also marks the beginning and ending points of the test in the code that is executed.

The application compares a result of the test with a corresponding baseline result in the set of baseline results (block 512). The application determines whether the test result and the baseline result match within a tolerance (block 514).

If the test result and the baseline result match within the tolerance ("Yes" path of block 514), the application proceeds to block 520 and continues executing process 500 therefrom. If the test result and the baseline result do not match within the specified tolerance ("No" path of block 514), the application identifies a portion of an upstream document that is associated with the section of the code that produced the test result, e.g., a portion of a business requirements document or a technical specification, or portions in a combination of these and other upstream documents (block 516).

The application marks or annotates the one or more portions in one or more upstream documents according to the nature of the mismatch in block 514, the degree of the mismatch in block 514, or both (block 518). For example, an error in the test result, a missing test result, a mismatch exceeding the tolerance, are some example mismatch conditions that can produce different annotations in block 518. Any suitable type of annotation and a manner of presenting the annotated portions to a user can be used with an embodiment without departing the scope of the illustrative embodiments. For example, one type of annotation may highlight a portion in different colors or shades depending upon the type of mismatch in block 514. Another example type of annotation may highlight a portion in different fonts or font sizes depending upon the type of mismatch in block 514. Another example type of annotation may position a portion differently in a display depending upon the type of mismatch in block 514. Many other ways of annotating portions of upstream documents and presenting the annotated upstream documents to a user will become apparent from this disclosure to those of ordinary skill in the art, and the same are contemplated within the scope of the illustrative embodiments.

The application determines if more test results are to be validated in this manner (block 520). If more test results are to be validated ("Yes" path of block 520), the application returns process 500 to block 512 to select and validate another test result. If no more test results are to be validated ("No" path of block 520), the application presents the annotated portions to a user. The application ends process 500 thereafter.

With reference to FIG. 6, this figure depicts a flowchart of another example process for correlating test result variations with business requirements in accordance with an illustrative embodiment. Process 600 can be implemented in application 402 in FIG. 4.

The application receives a base version and a new version of code for regression testing (block 602). The application marks the known changed code sections in the base version and the new version according to a change specification or change requirement document (block 604).

The application determines a configuration of a base data processing environment (block 606). The application creates a duplicate of the base data processing environment to execute the marked base version of the code (block 608). The application creates another duplicate of the base data processing environment to execute the marked new version of the code (block 610).

The application executes, in parallel, an unchanged section of the marked base version in the first duplicate data processing environment, and executes a corresponding unchanged section of the marked new version in the second duplicate data processing environment (block 612).

The application obtains a baseline result from the execution of the unchanged section of the base version in the first duplicate data processing environment (block 614). The application obtains a test result from the execution of the corresponding unchanged section of the new version in the second duplicate data processing environment (block 616).

The application compares the test result with the corresponding baseline result (block 618). The application determines whether the test result and the baseline result match within a tolerance (block 620).

If the test result and the baseline result match within the tolerance ("Yes" path of block 620), the application proceeds to block 626 and continues executing process 600 therefrom. If the test result and the baseline result do not match within the specified tolerance ("No" path of block 620), the application identifies a portion of an upstream document that is associated with the expected unchanged section of the new code that produced the mismatched test result, e.g., a portion of a business requirements document or a technical specification, or portions in a combination of these and other upstream documents (block 622).

The application marks or annotates the one or more portions in one or more upstream documents according to the nature of the mismatch in block 620, the degree of the mismatch in block 620, or both (block 624). The application determines if more test results are to be validated in this manner (block 626). If more test results are to be validated ("Yes" path of block 626), the application returns process 600 to block 618 to select and validate another test result. If no more test results are to be validated ("No" path of block 626), the application presents the annotated portions to a user. The application ends process 600 thereafter.

Thus, a computer implemented method, system or apparatus, and computer program product are provided in the illustrative embodiments for correlating test result variations with business requirements. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for relating test data to business requirements, the method comprising:
   receiving a configuration information, wherein the configuration information relates to a base data processing environment where a base version of a code has been executed;
   configuring a test data processing environment according to the configuration information such that the test data processing environment is a duplicate of the base data processing environment;
   configuring a duplicate base data processing environment according to the configuration information such that the duplicate base data processing environment is another duplicate of the base data processing environment;
   configuring, in the test data processing environment, a test operation of the code, a section of the code corresponding to a portion of a business requirements document, a modification of the base version of the code according to a change requirement resulting in the code, and wherein the section of the code remains unchanged in response to the change requirement from a corresponding section of the base version of the code, wherein the base version of the code is an unmodified existing version of the code;
   receiving a set of baseline results, wherein a first baseline result in the set of baseline results is obtained from an execution of the section of the base version of the code;
   executing the test operation, wherein the test operation executes the section of the code;
   associating, responsive to executing the test operation, the section of the code with a test result produced from the test operation;
   determining whether the test result matches the first baseline result from the set of baseline results within a tolerance; and
   annotating, responsive to the test result not matching the first baseline result from the set of baseline results within the tolerance, the portion of the business requirements document.

2. The method of claim 1, further comprising:
   executing in parallel, the base version of the code in the duplicate base data processing environment and the code in the test data processing environment; and
   obtaining the set of baseline results from parallel execution of the base version of the code in the duplicate base data processing environment.

3. The method of claim 1, further comprising:
   executing in parallel, the section of the base version of the code and the section of the code.

4. The method of claim 1, further comprising:
   annotating, responsive to the test result not matching the first baseline result from the set of baseline results within the tolerance, a portion of a technical specification document, wherein the section of the code further corresponds to a portion of the technical specification document, the code being generated according to the technical specification document, and the technical specification document being generated according to the business requirements document.

5. The method of claim 4, further comprising:
   presenting the annotated portion of the technical specification document;
   accepting a user input at the presented annotated portion of the technical specification document, the user input causing a selection of the section of the code; and
   changing the section of the code such that a second test result from a second test operation on the changed section of the code matches the first baseline result from the set of baseline results within the tolerance.

6. The method of claim 1, further comprising:
   presenting the annotated portion of the business requirements document;
   accepting a user input at the presented annotated portion of the business requirements document, the user input causing a selection of the section of the code; and
   changing the section of the code such that a second test result from a second test operation on the changed section of the code matches the first baseline result from the set of baseline results within the tolerance.

7. The method of claim 1, wherein the first baseline result comprises an expected result from the test operation, the expected result being sufficient to satisfy an objective in the portion of the business requirements document.

8. The method of claim 1, wherein the method is embodied in a computer program product comprising one or more computer-readable storage devices and computer-readable program instructions which are stored on the one or more computer-readable tangible storage devices and executed by one or more processors.

9. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

10. A computer program product for relating test data to business requirements, the computer program product comprising:
one or more computer-readable storage medium;
program instructions, stored on at least one of the one or more storage devices, to receive a configuration information, wherein the configuration information relates to a base data processing environment where a base version of a code has been executed;
program instructions, stored on at least one of the one or more storage devices, to configure a test data processing environment according to the configuration information such that the test data processing environment is a duplicate of the base data processing environment;
program instructions, stored on at least one of the one or more storage devices, to configure a duplicate base data processing environment according to the configuration information such that the duplicate base data processing environment is another duplicate of the base data processing environment;
program instructions, stored on at least one of the one or more storage devices, to configure, in the test data processing environment, a test operation of the code, a section of the code corresponding to a portion of a business requirements document, a modification of the base version of the code according to a change requirement resulting in the code, and wherein the section of the code remains unchanged in response to the change requirement from a corresponding section of the base version of the code, wherein the base version of the code is an unmodified existing version of the code;
program instructions, stored on at least one of the one or more storage devices, to receive a set of baseline results, wherein a first baseline result in the set of baseline results is obtained from an execution of the section of the base version of the code;
program instructions, stored on at least one of the one or more storage devices, to execute the test operation, wherein the test operation executes the section of the code;
program instructions, stored on at least one of the one or more storage devices, to associate, responsive to the program instructions to execute the test operation, the section of the code with a test result produced from the test operation;
program instructions, stored on at least one of the one or more storage devices, to determine whether the test result matches the first baseline result from the set of baseline results within a tolerance; and
program instructions, stored on at least one of the one or more storage devices, to annotate, responsive to the test result not matching the first baseline result from the set of baseline results within the tolerance, the portion of the business requirements document.

11. The computer program product of claim 10, further comprising:
program instructions, stored on at least one of the one or more storage devices, to execute in parallel, the base version of the code in the duplicate base data processing environment and the code in the test data processing environment; and
program instructions, stored on at least one of the one or more storage devices, to obtain the set of baseline results from parallel execution of the base version of the code in the duplicate base data processing environment.

12. The computer program product of claim 10, further comprising:
program instructions, stored on at least one of the one or more storage devices, to execute in parallel, the section of the base version of the code and the section of the code.

13. The computer program product of claim 10, further comprising:
program instructions, stored on at least one of the one or more storage devices, to annotate, responsive to the test result not matching the first baseline result from the set of baseline results within the tolerance, a portion of a technical specification document, wherein the section of the code further corresponds to a portion of the technical specification document, the code being generated according to the technical specification document, and the technical specification document being generated according to the business requirements document.

14. The computer program product of claim 13, further comprising:
program instructions, stored on at least one of the one or more storage devices, to present the annotated portion of the technical specification document;
program instructions, stored on at least one of the one or more storage devices, to accept a user input at the presented annotated portion of the technical specification document, the user input causing a selection of the section of the code; and
program instructions, stored on at least one of the one or more storage devices, to change the section of the code such that a second test result from a second test operation on the changed section of the code matches the first baseline result from the set of baseline results within the tolerance.

15. The computer program product of claim 10, further comprising:
program instructions, stored on at least one of the one or more storage devices, to present the annotated portion of the business requirements document;
program instructions, stored on at least one of the one or more storage devices, to accept a user input at the presented annotated portion of the business requirements document, the user input causing a selection of the section of the code; and
program instructions, stored on at least one of the one or more storage devices, to change the section of the code such that a second test result from a second test operation on the changed section of the code matches the first baseline result from the set of baseline results within the tolerance.

16. The computer program product of claim 10, wherein the first baseline result comprises an expected result from the test operation, the expected result being sufficient to satisfy an objective in the portion of the business requirements document.

17. A computer system for relating test data to business requirements, the computer system comprising:

one or more processors, one or more computer-readable memories and one or more computer-readable storage devices;

program instructions, stored on at least one of the one or more storage devices for execution by at least one of the one or more processors via at least one of the one or more memories, to receive a configuration information, wherein the configuration information relates to a base data processing environment where a base version of a code has been executed;

program instructions, stored on at least one of the one or more storage devices for execution by at least one of the one or more processors via at least one of the one or more memories, to configure a test data processing environment according to the configuration information such that the test data processing environment is a duplicate of the base data processing environment;

program instructions, stored on at least one of the one or more storage devices for execution by at least one of the one or more processors via at least one of the one or more memories, to configure a duplicate base data processing environment according to the configuration information such that the duplicate base data processing environment is another duplicate of the base data processing environment;

program instructions, stored on at least one of the one or more storage devices for execution by at least one of the one or more processors via at least one of the one or more memories, to configure, in the test data processing environment, a test operation of the code, a section of the code corresponding to a portion of a business requirements document, a modification of the base version of the code according to a change requirement resulting in the code, and wherein the section of the code remains unchanged in response to the change requirement from a corresponding section of the base version of the code, wherein the base version of the code is an unmodified existing version of the code;

program instructions, stored on at least one of the one or more storage devices for execution by at least one of the one or more processors via at least one of the one or more memories, to receive a set of baseline results, wherein a first baseline result in the set of baseline results is obtained from an execution of the section of the base version of the code;

program instructions, stored on at least one of the one or more storage devices for execution by at least one of the one or more processors via at least one of the one or more memories, to execute the test operation, wherein the test operation executes the section of the code;

program instructions, stored on at least one of the one or more storage devices for execution by at least one of the one or more processors via at least one of the one or more memories, to associate, responsive to the program instructions to execute the test operation, the section of the code with a test result produced from the test operation;

program instructions, stored on at least one of the one or more storage devices for execution by at least one of the one or more processors via at least one of the one or more memories, to determine whether the test result matches the first baseline result from the set of baseline results within a tolerance; and program instructions, stored on at least one of the one or more storage devices for execution by at least one of the one or more processors via at least one of the one or more memories, to annotate, responsive to the test result not matching the first baseline result from the set of baseline results within the tolerance, the portion of the business requirements document.

* * * * *